US012069535B2

(12) United States Patent
Gupta et al.

(10) Patent No.: US 12,069,535 B2
(45) Date of Patent: Aug. 20, 2024

(54) INTELLIGENT PRECURSORY SYSTEMATIZED AUTHENTICATION

(71) Applicant: BANK OF AMERICA CORPORATION, Charlotte, NC (US)

(72) Inventors: Aarthi Gupta, Maharashtra (IN); Raja Arumugam Maharaja, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 373 days.

(21) Appl. No.: 17/667,840

(22) Filed: Feb. 9, 2022

(65) Prior Publication Data
US 2023/0254663 A1 Aug. 10, 2023

(51) Int. Cl.
*H04W 4/02* (2018.01)
*H04W 4/029* (2018.01)
*H04W 4/16* (2009.01)
*H04W 12/06* (2021.01)

(52) U.S. Cl.
CPC ........... *H04W 4/023* (2013.01); *H04W 4/029* (2018.02); *H04W 4/16* (2013.01); *H04W 12/068* (2021.01)

(58) Field of Classification Search
CPC ... H04W 4/023; H04W 4/029; H04W 12/068; H04W 4/16
See application file for complete search history.

(56) References Cited

U.S. PATENT DOCUMENTS

| | | | |
|---|---|---|---|
| 5,557,518 A | 9/1996 | Rosen | |
| 5,675,662 A | 10/1997 | Deaton et al. | |
| 6,463,127 B1 * | 10/2002 | Maier | G07C 9/37 379/38 |
| 6,827,260 B2 | 12/2004 | Stoutenburg et al. | |
| 6,941,274 B1 | 9/2005 | Hill et al. | |
| 7,003,493 B2 | 2/2006 | Weichert et al. | |
| 7,213,744 B2 | 5/2007 | Michelsen et al. | |
| 7,349,566 B2 | 3/2008 | Jones et al. | |
| 8,473,352 B2 | 6/2013 | Diehl | |
| 9,747,587 B2 | 8/2017 | Diehl | |
| 10,346,817 B2 | 7/2019 | Lee | |
| 2001/0001877 A1 | 5/2001 | French et al. | |

(Continued)

*Primary Examiner* — Dai Phuong
(74) *Attorney, Agent, or Firm* — Moore & Van Allen PLLC; James C. Edwards

(57) ABSTRACT

An intelligent precursory systematized approach for verifying the identity (i.e., authentication) of a resource recipient when conducting an online or mobile application resource event. Machine learning (ML) models are used to determine whether the resource provider has been in contact with the resource provider and, if so, the currency and frequency of such contacts. Contacts are determined from accessing the resource providers call history as well as comparing GPS data obtained from both the resource provider's and resource recipient's mobile communication device. Based on the contact determination the ML models can determine whether to authenticate the resource recipient, require further authentication or provide the resource provider options to authenticate the resource recipient or require further authentication. Further authentication may come in the form of determining that the resource provider and resource recipient match in terms of a purpose for a pending resource event and/or a resource provider-generated OTP.

20 Claims, 6 Drawing Sheets

(56) References Cited

U.S. PATENT DOCUMENTS

| | | |
|---|---|---|
| 2002/0010684 A1 | 1/2002 | Moskowitz |
| 2002/0056043 A1 | 5/2002 | Glass |
| 2002/0166891 A1 | 11/2002 | Stoutenburg et al. |
| 2003/0063772 A1 | 4/2003 | Smith et al. |
| 2003/0149662 A1 | 8/2003 | Shore |
| 2003/0167237 A1 | 9/2003 | Degen et al. |
| 2004/0024700 A1 | 2/2004 | Petigny |
| 2004/0205023 A1 | 10/2004 | Hafer et al. |
| 2004/0215558 A1 | 10/2004 | Morales et al. |
| 2004/0260649 A1 | 12/2004 | Kagehiro et al. |
| 2005/0079474 A1 | 4/2005 | Lowe |
| 2005/0160052 A1 | 7/2005 | Schneider et al. |
| 2005/0238208 A1 | 10/2005 | Sim |
| 2005/0256539 A1 | 11/2005 | George et al. |
| 2005/0289582 A1 | 12/2005 | Tavares et al. |
| 2006/0006224 A1 | 1/2006 | Modi |
| 2006/0160525 A1 | 7/2006 | Watanabe |
| 2007/0084911 A1 | 4/2007 | Crowell |
| 2007/0112710 A1 | 5/2007 | Drane et al. |
| 2007/0113099 A1 | 5/2007 | Takikawa et al. |
| 2007/0175998 A1 | 8/2007 | Lev |
| 2007/0187494 A1 | 8/2007 | Hanna |
| 2007/0198432 A1 | 8/2007 | Pitroda et al. |
| 2007/0208662 A1 | 9/2007 | Jeronimus et al. |
| 2007/0208816 A1 | 9/2007 | Baldwin et al. |
| 2008/0065468 A1 | 3/2008 | Berg et al. |
| 2008/0243690 A1 | 10/2008 | Paintin et al. |
| 2008/0253621 A1 | 10/2008 | Connell et al. |
| 2008/0290154 A1 | 11/2008 | Barnhardt et al. |
| 2009/0061863 A1* | 3/2009 | Huggett ............... H04L 63/101 455/434 |
| 2009/0099983 A1 | 4/2009 | Drane et al. |
| 2009/0147990 A1 | 6/2009 | Lev |
| 2009/0266880 A1 | 10/2009 | Gustin et al. |
| 2010/0113863 A1 | 5/2010 | George et al. |
| 2010/0250375 A1 | 9/2010 | Diehl |
| 2011/0184247 A1 | 7/2011 | Contant et al. |
| 2012/0047525 A1 | 2/2012 | Campagna et al. |
| 2013/0041811 A1 | 2/2013 | Vazquez et al. |
| 2013/0282577 A1 | 10/2013 | Milne |
| 2014/0065997 A1* | 3/2014 | Walker ................ H04W 4/90 455/404.1 |
| 2014/0279391 A1 | 9/2014 | Gallo et al. |
| 2022/0027812 A1* | 1/2022 | Bahjat ............... G06Q 30/0645 |
| 2022/0101378 A1* | 3/2022 | Manfield ........... G06Q 30/0264 |

* cited by examiner

INTELLIGENT PRECURSORY SYSTEMATIZED AUTHENTICATION

FIELD OF THE INVENTION

The present invention is generally directed identity verification and, more specifically, verifying the identity of a resource event recipient when conducting online or mobile resource events.

BACKGROUND

Mobile and Internet resource event platforms allow for users (i.e., resource providers) to conduct resource events with other users (i.e., resource recipients). Typically, the resource provider is required to enter the resource recipient's information (e.g., resource repository number, zip code, mobile telephone number or the like) into designated fields within the mobile application or webpage of the Internet resource event site in order to add a resource recipient to the resource provider's list of verified resource recipients. While systems are in place to ensure that the entered information is associated with a valid resource recipient (i.e., the name and resource repository number matchup or the like), currently limited means exist to ensure that the information that is being entered by the resource provider is, in fact, associated with the intended resource recipient. In one example, a resource provider may erroneously enter the resource recipient's information and the incorrect information may matchup with an unintended but valid resource recipient. In another example, a payor may be intentionally or unintentionally be provided the wrong resource recipient information (i.e., thinking they are transferring resources to the correct resource recipient when, in fact, the information is associated with a another resource recipient (e.g., in the intentional case, a wrongdoer or the like).

Therefore, a need exists to develop systems, methods and the like for verifying the identity of a resource recipient when conducting resource events within a mobile resource event platform or an online resource event platform (i.e., verifying that the resource recipient's information entered by the payee is, in fact, associated with the intended resource recipient).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing an intelligent precursory systematized approach for verifying the identity of mobile and/or Internet resource event recipients.

Specifically, an authentication application including a machine learning model(s) runs in the background of a computer platform (e.g., mobile device or the like) that is able to detect when a user is attempting to add a resource recipient to a verified listing of resource recipients within a mobile resource event application or Internet resource event platform. Once a mobile phone number has added during the attempt to add a resource recipient, the machine learning model searches the users contacts, stored in the mobile device, for the mobile phone number to see if a match exists. If a match exists, a pop-up notification or the like is displayed on the resource provider's mobile device asking whether the individual in the contacts is the intended resource recipient. If the resource provider responds in the affirmative, the payment recipient is deemed to be authenticated/verified. In optional embodiments of the invention, other databases may be searched for the mobile telephone number, such as resource holding entity databases associated with the resource provider and similar notifications may be displayed to the resource provider, requiring confirmation that the individual in the database is the intended resource recipient.

If the user responds in the negative, the authentication application will (i) search call history data to determine if the resource provider has previously received calls or made calls from/to the mobile phone number of the resource recipient, and (iii) access Global Positioning System (GPS) data of both the resource provider's mobile communication device and the resource recipient's mobile communication device to determine if the resource provider has come within a predetermined geolocation range contact (i.e., close proximity of the intended resource recipient). Searching the call history and determining close proximity to the intended resource recipient infers that the resource provider knows (i.e., has been in contact with) the resource recipient.

Based on the search of the call history and the comparison of GPS data from both mobile communication device, the authentication determines an authentication status (i.e., (i) authenticate the resource recipient, (ii) require further authentication, (iii) deny authentication of the resource recipient) or provide the resource provider authentication options for authenticating the resource recipient (i.e., (i) authenticate the resource recipient, (ii) select from among one or more further authentication mechanisms, (iii) deny authentication of the resource recipient).

In this regard, the present invention serves to provide the resource provider an intelligent systematized approach to verify the identity (i.e., authenticate) of a resource recipient when conducting an online or mobile application resource event. As a result, the present invention, prevents instances in which the resource recipient may enter valid but unintended resource recipient information or instances in which the resource provider receives, either intentionally or unintentionally, information for the incorrect resource recipient.

A system for intelligent and precursory authentication of identity defines first embodiments of the invention. The system includes a first mobile communication device (i) associated with a resource recipient, (ii) assigned a first mobile telephone number, and (iii) comprising a first computing platform including a first memory, one or more first processing devices in communication with the first memory and a first geographic location-determining mechanism in communication with at least one of the first processing devices.

The system additionally includes a second mobile communication device (i) associated with a resource provider, (ii) assigned a second mobile telephone number, and (iii) comprising a second computing platform including a second memory, one or more second processing devices in communication with the second memory and a second geographic location-determining mechanism in communication with at least one of the first processing devices, wherein the second memory stores an authentication application including at least one machine learning model. The authentication application is executable by at least one of the second processing devices.

The authentication application is configured to detect that the resource provider is attempting to add the resource recipient to a list of approved resource recipients associated with an online resource event platform or a mobile resource event application. In response to the resource provider adding the first mobile telephone number as part of the attempt to add the resource recipient, the authentication application is further configured to search a list of contacts stored in the second memory to determine whether the first telephone number is associated with a contact in the list of contacts. In response to determining that the first telephone number is not associated with a contact in the list of contacts, the authentication application is configured to (i) search a historical listing of telephone calls made and received by the second mobile communication to determine whether the resource provider has made or received calls to/from the first mobile telephone number, and (ii) access and analyze location data received from the first and second location-determining mechanisms to determine whether the first mobile communication device has been within a predetermined geolocation range of the second mobile communication device. Further, the authentication application is configured to determine authentication status of the resource recipient or provide the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

In specific embodiments of the system, the authentication status includes one selected from the group consisting of (i) authenticate the resource recipient, (ii) deny authentication of the resource recipient, and (iii) require further authentication. In related specific embodiments of the system, the authentication options provided to the resource provider include (i) authenticate the resource recipient, (ii) deny authentication of the resource recipient, and (iii) select from among one or more further authentication mechanisms.

In other specific embodiments of the system, the authentication application is further configured to, in response to determining that the first telephone number is associated with a contact in the list of contacts, generate and provide a query notification on a display of the second mobile communication device that requires the resource provider to confirm that the contact is the resource recipient, and in response to the resource provider providing a first input to the query notification that confirms the contact is the resource recipient, provide authentication of the resource recipient, wherein providing authentication allows for the resource provider to be added to the list of approved resource recipients. In related embodiments of the system, in response to the resource provider providing a second input to the query notification that denies that the contact is the resource recipient, the authentication application is further configured to (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device.

In still further specific embodiments of the system, in response to the resource provider adding the first mobile telephone number as part of the attempt to add the resource recipient, the authentication application is configured to search a resource repository database associated with a resource holding entity at which the resource provider holds resources to determine whether the first telephone number is associated with a resource repository held by a resource repository holder, and, in response to determining that the first telephone number is not associated with (a) a contact in the list of contacts and (b) a resource repository, (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device. In related embodiments of the system, in response to determining that the first telephone number is associated with a resource repository, the authentication application is further configured to generate and provide a query notification on a display of the second mobile communication device that requires the resource provider to confirm that the resource repository holder is the resource recipient, and in response to the resource provider providing a first input to the query notification that confirms the resource repository holder is the resource recipient, provide authentication of the resource recipient, wherein providing authentication allows for the resource provider to be added to the list of approved resource recipients. In such embodiments of the system, in response to the resource provider providing a second input to the query notification that denies that the resource repository holder is the resource recipient, the authentication application is configured to (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device.

In further specific embodiments of the system, the authentication application is configured to determine an authentication confidence score based at least on (i) whether the resource provider has made or received calls to/from the first mobile telephone number, (ii) the volume of calls made to or received from the first mobile telephone number, (iii) a nearness to current time of calls made to or received from the first mobile telephone number (iv) whether the first mobile communication device has been within the predetermined geolocation range of the second mobile communication device, (v) the volume of instances that the first mobile communication device has been within the predetermined geolocation range of the second mobile communication device, and (vi) a nearness to current time of instances in which the first mobile communication device has been within the predetermined geolocation range of the second mobile communication device. In such embodiments of the system, the authentication application may be further configured to determine, based on a plurality of confidence score thresholds, at least one selected from the group consisting of (i) authentication of the resource recipient, (ii) that the resource provider is required to confirm an individual associated with the first mobile telephone number as the resource recipient, wherein the confirmation provides authentication, (iii) that the resource required is to be provide further authentication mechanisms, or (iv) require further authentication.

In additional specific embodiments of the system, the authentication is further configured to generate and initiate communication of a first query notification to the first mobile communication device that asks the resource recipient whether they are expecting resources from someone associated with the second mobile telephone number, and, in response to receiving an input to the first query notification that confirms that the resource recipient is expecting resources from someone associated with the second mobile telephone number, generate and communicate a second query notification to the first mobile communication and the second mobile communication that asks the resource recipient and the resource provider to input a purpose for a pending resource exchange event. Further, in response to receiving, from the resource recipient and the resources provider, inputs to the second query notification that define a purpose for the pending resource exchange event, the authentication application is configured to correlate differences in the inputs to determine whether the purposes for the pending resource exchange match, and, in response to determining that the purposes for the pending resource exchange match, provide authentication to the resource recipient. In related embodiments of the system, the authentication application is further configured to generate and initiate communication of the first query notification to the first mobile communication device in response to (i) the authentication status of the resource recipient requiring further authentication, or (ii) providing the resource provider an option to choose from amongst one or more further authentication mechanisms including a purpose matching authentication option and the resource provider selecting the purpose matching authentication option.

Moreover, in additional embodiments of the system, the authentication application is further configured to request the resource provider to generate and input a One Time Password (OTP), in response to the resource provider inputting the resource provider-generated OTP, communicate the OTP to the first mobile communication device, and in response to the resource recipient providing the OTP within a designated entry field, provide authentication of the resource recipient. In related embodiments of the system, the authentication application is further configured to provide the resource provider with a plurality of options for communicating the OTP to the first mobile communication. The plurality of options include (i) a Short Message Service (SMS) message communicated from the second mobile communication device, (ii) a message communicated from either the online resource event platform or the mobile resource event application, (iii) an automated telephone call, and (iv) a manual telephone call made by the resource provider. In further related embodiments of the system, the authentication application is further configured the OTP is an answer to a shared secret known by both the resource recipient and resource provider. In further related embodiments of the system, the authentication application is further configured to request the resource provider to generate and input the OTP, in response to (i) the authentication status of the resource recipient requiring further authentication, or (ii) providing the resource provider an option to choose from amongst one or more further authentication mechanisms including an OTP authentication option and the resource provider selecting the OTP option.

A computer-implemented method for intelligent and precursory authentication of identity defines second embodiments of the invention. The method is executed by one or more processing devices in a first mobile communication device. The method includes determining that a resource provider is attempting to add a resource recipient to a list of approved resource recipients associated with an online resource event platform or a mobile resource event application. In addition, the method includes, in response to the resource provider adding a first mobile telephone number of a second mobile communication device as part of the attempt to add the resource recipient, searching a list of contacts stored on the first mobile communication device to determine whether the first telephone number is associated with a contact in the list of contacts. Additionally, the method includes, in response to determining that the first telephone number is not associated with a contact in the list of contacts, (i) searching a historical listing of telephone calls made and received by the first mobile communication to determine whether the resource provider has made or received calls to/from the first mobile telephone number, and (ii) accessing and analyzing physical location data of the first and second mobile communication devices to determine whether the first mobile communication device has been within a predetermined geolocation range of the second mobile communication device. Further, the method includes determining authentication status of the resource recipient or providing the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

In specific embodiments the computer-implemented method further includes, based on (i) the authentication status, or (ii) the resource provider selecting a purpose matching authentication option, generating and initiating communication of a first query notification to the second mobile communication device that asks the resource recipient whether they are expecting resources from someone associated with the first mobile telephone number and, in response to receiving an input to the first query notification that confirms that the resource recipient is expecting resources from someone associated with the first mobile telephone number, generating and communicating a second query notification to the second mobile communication and the first mobile communication that asks the resource recipient and the resource provider to input a purpose for a pending resource exchange event. Further, the method includes in response to receiving, from the resource recipient and the resources provider, inputs to the second query notification that define a purpose for the pending resource exchange event, correlating differences in the inputs to determine whether the purposes for the pending resource exchange match. Moreover, the method includes in response to determining that the purposes for the pending resource exchange match, providing authentication to the resource recipient.

In additionally specific embodiments the computer-implemented method includes, based on (i) the authentication status, or (ii) the resource provider selecting a One Time Password (OTP) authentication option, requesting the resource provider to generate and input a One Time Password (OTP), in response to the resource provider inputting the resource provider-generated OTP, initiating communication of the OTP to the second mobile communication device; and, in response to the resource recipient providing the OTP within a designated entry field, provide authentication of the resource recipient.

A computer program product including a non-transitory computer-readable medium defines third embodiments of the invention. The computer-readable medium includes a first set of codes for causing a first mobile communication device to determine that a resource provider is attempting to add a resource recipient to a list of approved resource recipients associated with an online resource event platform or a mobile resource event application. Additionally, the computer-readable medium includes a second set of codes for causing the first mobile communication device to, in response to the resource provider adding a mobile telephone number of a second mobile communication device as part of the attempt to add the resource recipient, search a list of contacts stored on the first mobile communication device to determine whether the first telephone number is associated with a contact in the list of contacts. Further, the computer-readable medium includes a third set of codes for causing the first mobile communication device to, in response to determining that the first telephone number is not associated with a contact in the list of contacts, (i) searching a historical listing of telephone calls made and received by the first mobile communication to determine whether the resource provider has made or received calls to/from the first mobile telephone number, and (ii) accessing and analyzing physical location data of the first and second mobile communication devices to determine whether the first mobile communication device has been within a predetermined geolocation range of the second mobile communication device, Moreover, the computer-readable medium includes a fourth set of codes for causing the first mobile communication device to determine authentication status of the resource recipient or provide the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

Thus, according to embodiments of the invention, which will be discussed in greater detail below, the present invention provides for an intelligent systematized approach to verifying identity (i.e., authentication) when conducting an online or mobile application resource event. As a result, the present invention, prevents instances in which the resource recipient may enter valid but unintended resource recipient information or instances in which the resource provider receives, either intentionally or unintentionally, information for the incorrect resource recipient.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
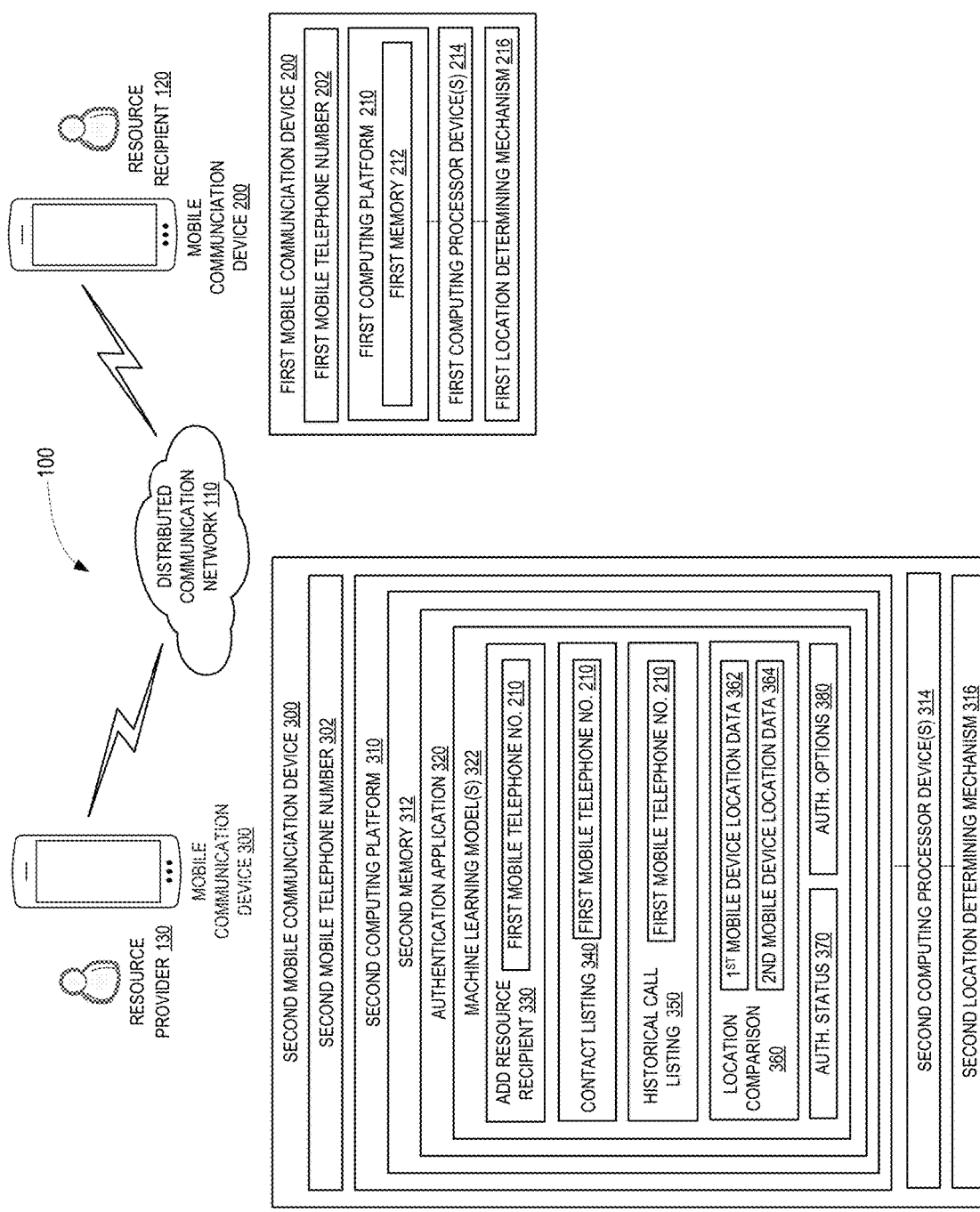
Figure 2:
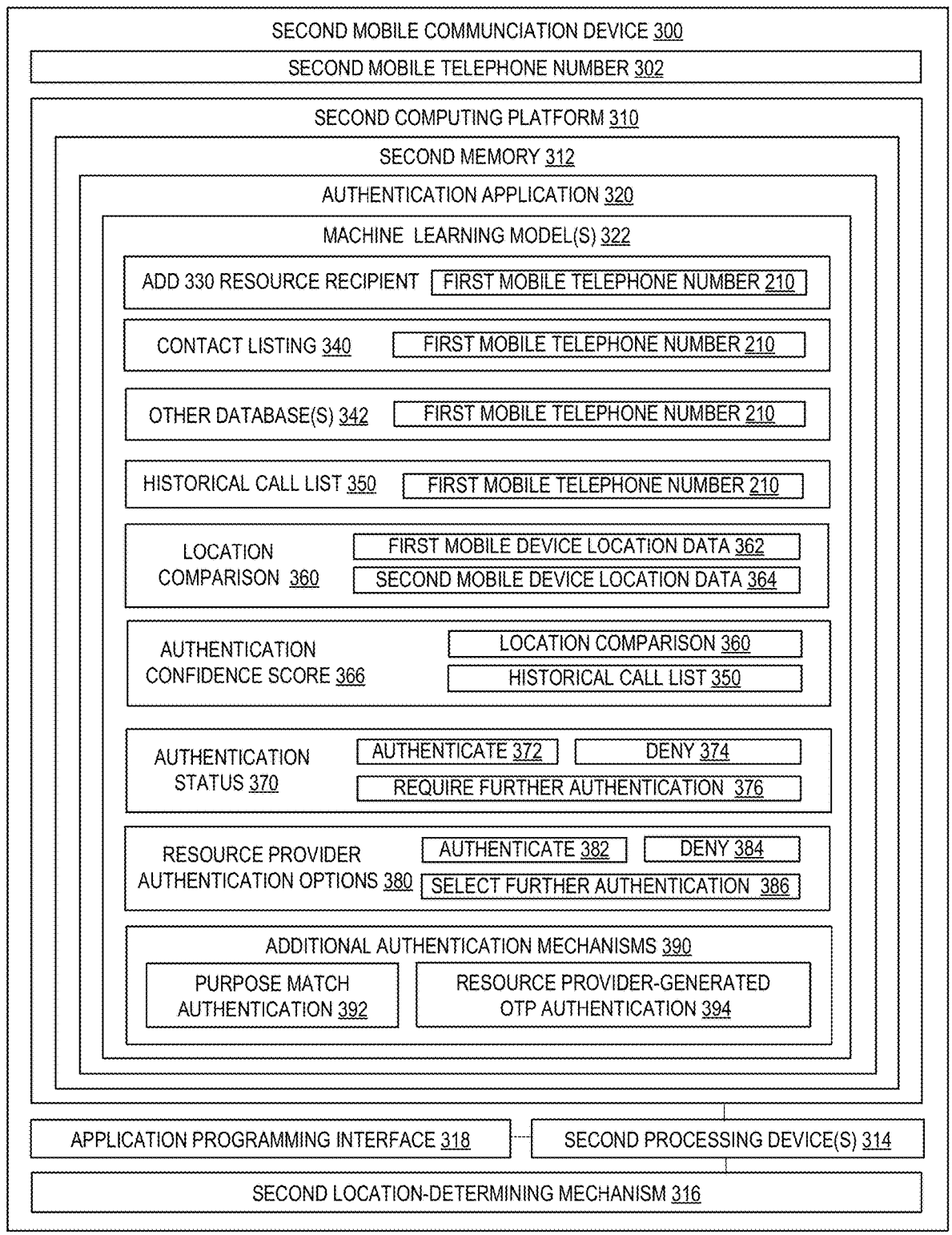
Figure 3:
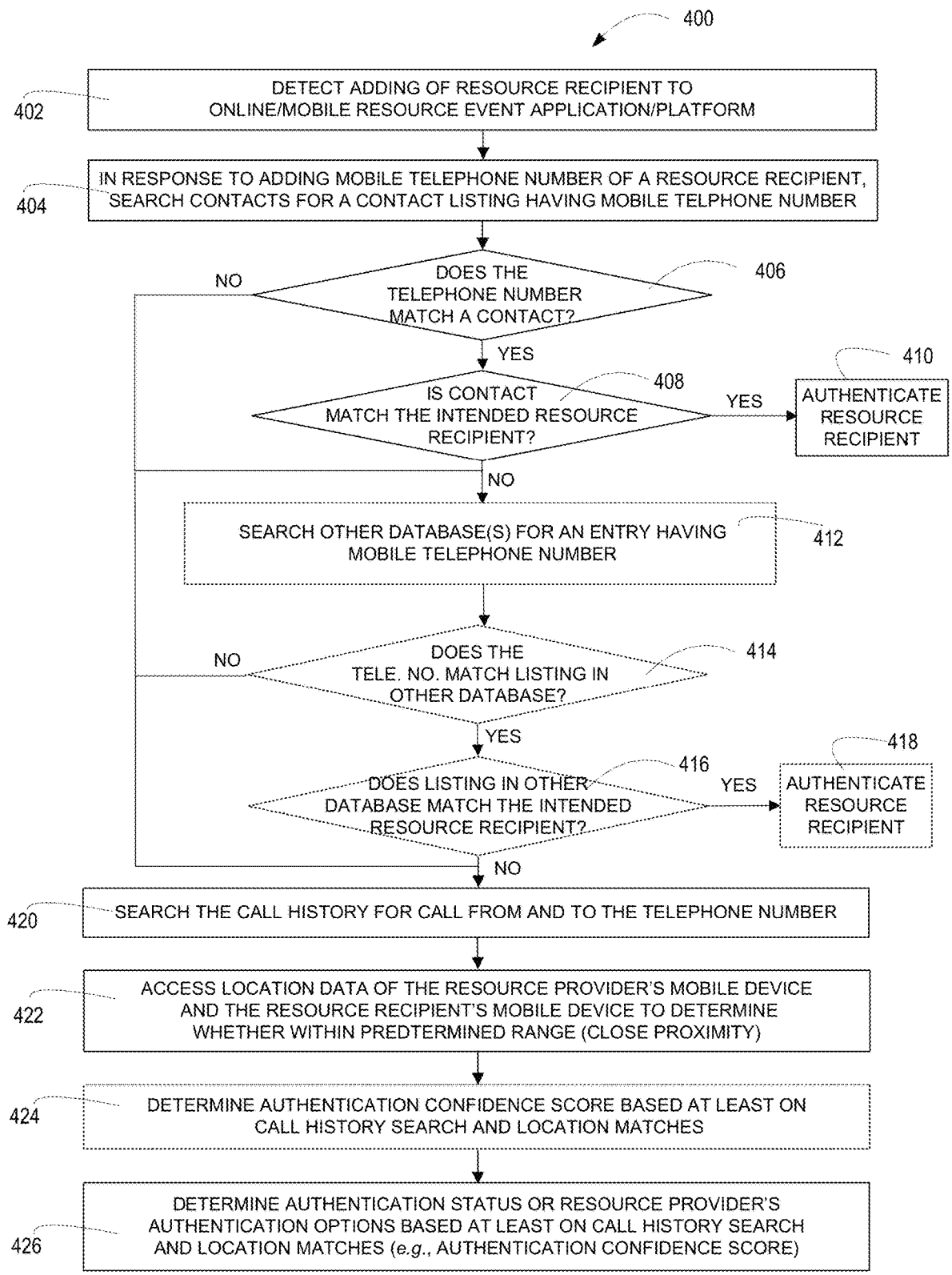
Figure 4:
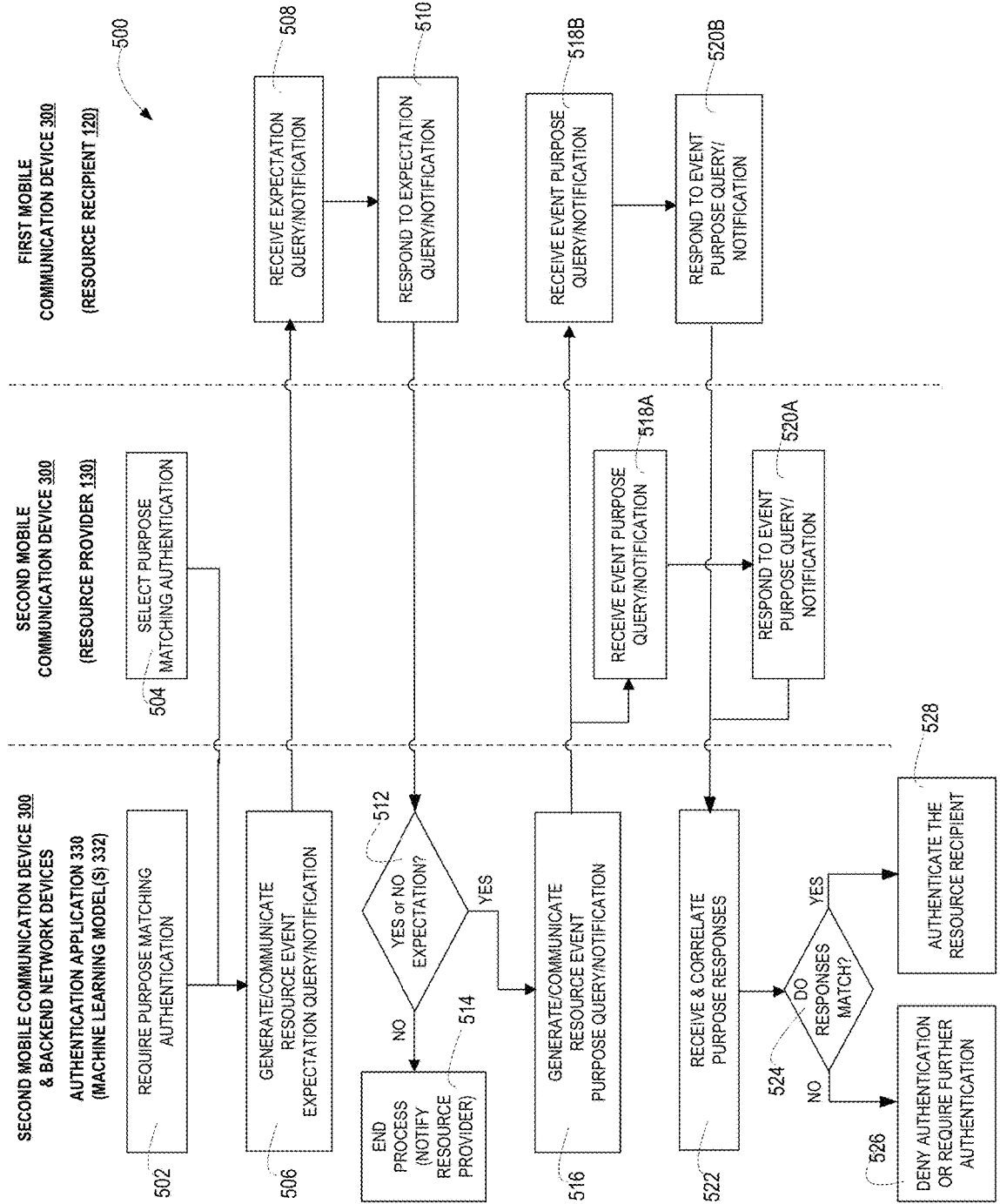
Figure 5:
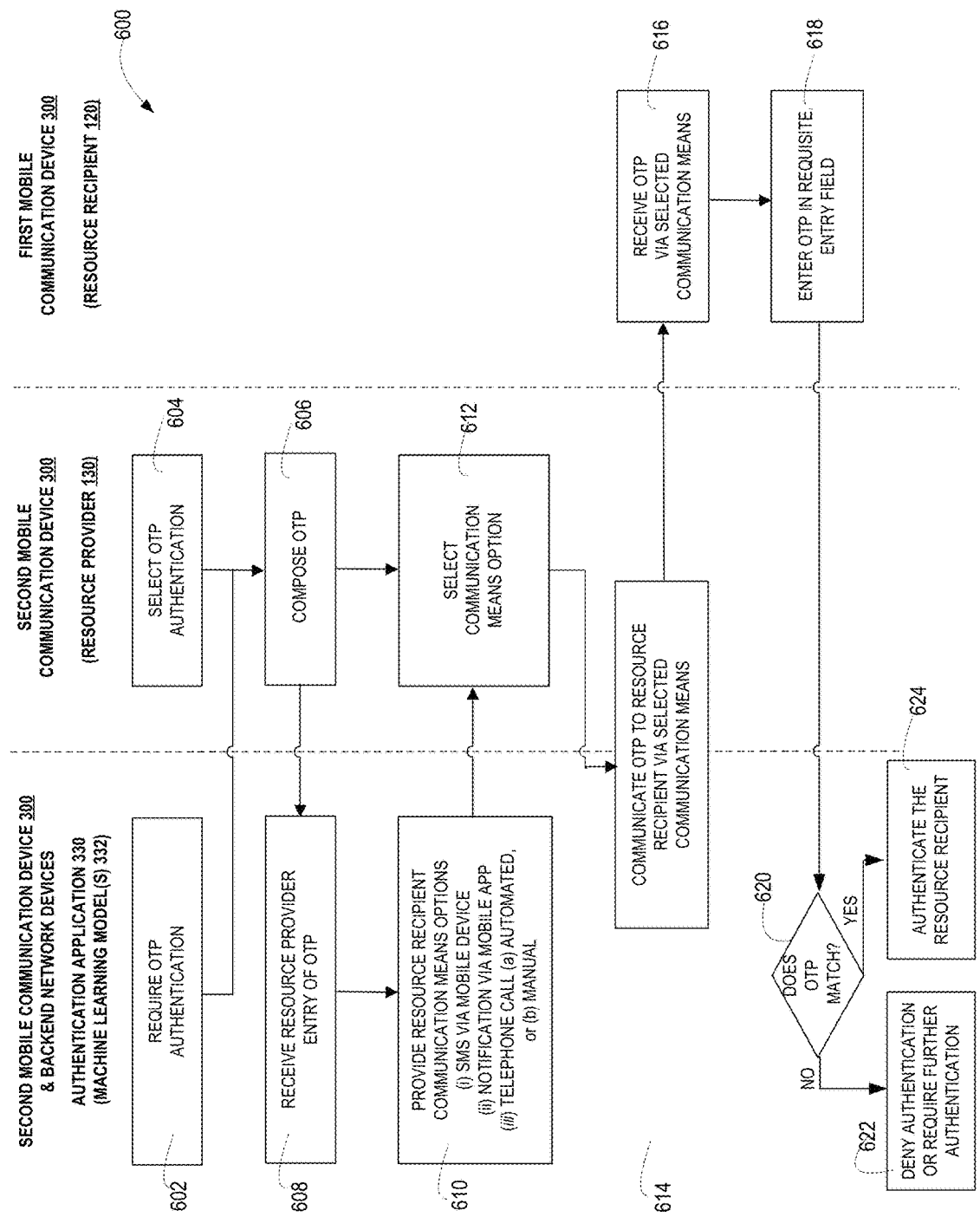
Figure 6:
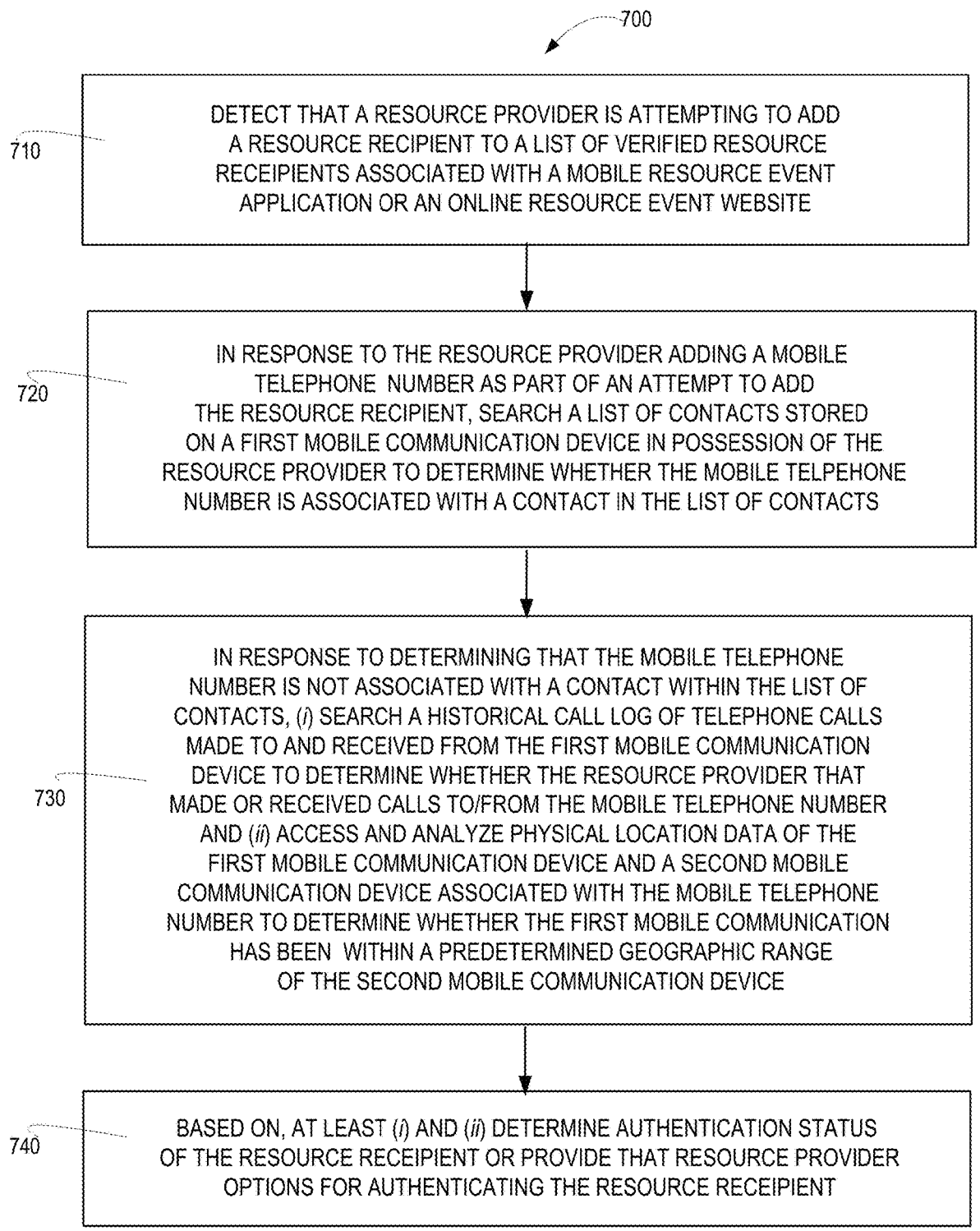

Having thus described embodiments of the disclosure in general terms, reference will now be made to the accompanying drawings, wherein:

FIG. 1 is a schematic diagram of a system for intelligent precursory systematized authentication, in accordance with some embodiments of the present disclosure;

FIG. 2 is a block diagram of a mobile communication device including an authentication application implementing machine learning models for intelligent precursory systematized authentication, in accordance with some embodiments of the present disclosure;

FIG. 3 is a flow diagram of a methodology for intelligent precursory systematized authentication, in accordance with some embodiments of the present disclosure;

FIG. 4 is a flow diagram of a methodology for an additional authentication mechanism including resource event purpose matching, in accordance with embodiments of the present invention;

FIG. 5 is a flow diagram of a methodology for an additional authentication mechanism including a resource provider-generated OTP, in accordance with embodiments of the present invention; and FIG. 6 is a flow diagram of a methodology for intelligent precursory systematized authentication, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for an intelligent precursory systematized approach to verifying the identity of mobile and/or Internet resource event recipients.

Specifically, an authentication application including a machine learning model(s) runs in the background of a computer platform (e.g., mobile device or the like) that is able to detect when a user is attempting to add a resource recipient to a verified listing of resource recipients within a mobile resource event application or Internet resource event platform. Once a mobile phone number has added during the attempt to add a resource recipient, the machine learning model searches the users contacts, stored in the mobile device, for the mobile phone number to see if a match exists. If a match exists, a pop-up notification or the like is displayed on the resource provider's mobile device asking whether the individual in the contacts is the intended resource recipient. If the resource provider responds in the affirmative, the payment recipient is deemed to be authenticated/verified. In optional embodiments of the invention, other databases may be searched for the mobile telephone number, such as resource holding entity databases associated with the resource provider and similar notifications may be displayed to the resource provider, requiring confirmation that the individual in the database is the intended resource recipient.

If the user responds in the negative to the pop-up notification or the like, the authentication application will (i) search call history data to determine if the resource provider has previously received calls or made calls from/to the mobile phone number of the resource recipient, and (iii) access Global Positioning System (GPS) data of both the resource provider's mobile communication device and the resource recipient's mobile communication device to determine if the resource provider has come within a predetermined geolocation range contact (i.e., close proximity of the intended resource recipient). Searching the call history and determining close proximity to the intended resource recipient infers that the resource provider knows (i.e., has been in contact with) the resource recipient.

Based on the search of the call history and the comparison of GPS data from both mobile communication device, the authentication determines an authentication status (i.e., (i) authenticate the resource recipient, (ii) require further authentication, (iii) deny authentication of the resource recipient) or provide the resource provider authentication options for authenticating the resource recipient (i.e., (i) authenticate the resource recipient, (ii) select from among one or more further authentication mechanisms, (iii) deny authentication of the resource recipient).

In specific embodiments of the invention, if the user responds in the negative, the machine learning model will determine a identity verification confidence score for the payment recipient based at least on the (ii) searching call history data to determine if the resource provider has previously received calls or made call from/to the mobile phone number of the resource recipient and, if so, the nearness in time to current time and the volume of the calls, and (iii) accessing GPS of both the resource provider's mobile device and the resource recipient's mobile communication device to determine if the resource provider has come in predetermined geolocation range contact of the resource recipient (i.e., close proximity of the intended resource recipient) and, if so, the nearness in time to current time and volume of the contacts. In some embodiments of the invention, other factors may be used in the identity verification confidence score, such as, but not limited to, matches of the mobile telephone number with information in external databases, such as resource holding entity databases or the like. Based on the identity verification confidence score (i.e., setting different identity verification confidence score thresholds), the machine learning model may choose to (i) automatically verify the identity of the intended resource recipient (ii) ask the resource recipient to confirm the identity of the intended recipient based on the confidence score, (iii) ask the resource provider if they desire further authentication or (iv) require further authentication.

According to specific embodiments of the invention, if the resource provider chooses to conduct further authentication or the authentication application requires further authentication one or both of two additional authentication techniques may be employed. In specific embodiments of the invention, the resource provider or the authentication application may decide which one of the two additional authentication techniques to employ or whether both additional authentication techniques should be employed.

One of the additional authentication techniques is based on the resource provider and resource recipient being determined to have a matching purposes for the pending resource event. In such embodiments of the invention, the authentication application communicates a query, via SMS or the like, to the intended resource recipient asking if they are expecting payment from the resource provider's mobile telephone number (without identifying the name of the resource provider). If the intended resource recipient responds in the negative, they are deemed to be not verified and a notification is communicated to the resource provider notifying of such. If the intended resource recipient responds in the affirmative, then the authentication application queries both the resource provider (via pop-up notification) and the resource recipient (via SMS or the like) to enter, in one or a few words, the purpose for the resource event. Since the responses are likely not be exact matches, the machine learning model of the authentication application is invoked to correlate the two responses to determine if the purposes match and, if so, the identity of the intended recipient is deemed to be verified. If the machine learning model is unable to correlate the purposes, further authentication techniques may be required (see below) or the intended resource recipient may be deemed to be not verified and a notification is communicated to the resource provider notifying of such.

The other additional authentication technique is based on a resource-provider generated One Time Password (OTP). Specifically, the OTP, which may be any number of characters, is generated by the user (not by the mobile application, online site and/or resource holding entity) and communicated to the intended resource by a communication means chosen by the resource provider. The communication options for communicating the OTP to the intended recipient may include, (i) SMS that includes the OTP is sent from the resource provider's mobile communication device (as opposed to being sent from the mobile application or platform), (ii) mobile application uses the Internet to communicate a message that includes the OTP to the intended resource recipient's corresponding mobile application, or (iii) an automated or resource provider/manual mobile telephone call is placed to the intended resource recipient that announces the OTP. In the event that the user chooses the automated call option, the OTP may be a random passcode generated by the user or a user selected shared secret/question (e.g., city of birth of user or some other question that would readily be known by the intended resource recipient). If the intended resource recipient is able to properly enter the OTP or answer the shared secret question, the intended recipient is deemed to be authenticated. If the intended recipient is unable to properly enter the OTP or answer the shared secret question further authentication techniques may be required (see above) or the intended recipient may be deemed to be not verified and a notification is communicated to the resource provider notifying of such.

Thus, embodiments of the present invention, verify the identity (i.e., authenticate) of a resource recipient when conducting an online or mobile application resource event. As a result, the present invention, prevents instances in which the resource recipient may enter valid but unintended resource recipient information or instances in which the resource provider receives, either intentionally or unintentionally, information for the incorrect resource recipient.

Turning now to the figures, FIG. 1 a schematic diagram is provided of a system 100 for intelligent precursory systemized identity verification/authentication, in accordance with embodiments of the present invention. The system 100 is implemented within a distributed communication network 110, which may include one or more cellular networks, the Internet, one or more intranets, or the like. The system 100 includes first mobile communication device 200 that is in possession of a resource recipient 120 and associated with first mobile telephone number 202. In specific embodiments of the invention, the resource recipient 120 is a payee in a mobile or online payment transaction. First mobile communication device 200 including a first computing platform 210 having a first memory 212 and one or more first processor devices 214 in communication with first memory 212. Additionally, first computing platform 210 includes a first location-determining mechanism 216, e.g., a Global Positioning System (GPS) device or the like, which is in communication with at least one of the first processor device(s) 214 and is configured to determine geolocation of the first mobile communication device 200.

System 100 additionally includes second mobile communication device 300 in possession of a resource provider 130 and associated with the second mobile telephone number 302. In specific embodiments of the invention, the resource provider 130 is a payor in a mobile or online payment transaction. Second mobile communication device 300 including a second computing platform 310 having a second memory 312 and one or more second processor devices 314 in communication with second memory 312. Additionally, second computing platform 310 includes a second location-determining mechanism 316, e.g., a Global Positioning System (GPS) device or the like, which is in communication with at least one of the second processor device(s) 314 and is configured to determine geolocation of the second mobile communication device 300.

Second memory 312 of second computing platform 310 includes an authentication application 320 having one or more Machine Learning (ML) models 322 and executable by at least one of the one or more second processing devices 314. In specific embodiments of the invention, the authentication application 320 is configured to run on top of a mobile resource event application or an online resource event platform. In specific embodiments of the invention, the mobile resource event application is a mobile payment application, which may be standalone or included in a mobile banking application and the online resource event platform is an online payment platform, which may be included in an online banking platform. It should be noted that in specific embodiments of the invention, in which the authentication application 320 is implemented in conjunction with an online resource event platform, communication device 300 may not be a mobile communication device but may be any computing device with network connectivity capabilities, such as a PC or the like that is associated with resource provider 130 possessing the requisite mobile communication device. It should also be noted, that the functionality as described herein may be performed by the authentication application 320 internally within the second mobile communication device 300 or other communication device, as well as, externally within backend network devices that are in communication with the authentication application 320.

Authentication application 320 is configured to implement machine learning models 322 to detect/determine that the resource provider 130 is attempting to add 330 a resource recipient 120 to a list of approved/verified resource recipients associated with either a mobile resource event application or an online resource event platform. For example, the resource provider 120 may provide an input (e.g., name, resource repository number) to a entry field for adding a resource recipient within the mobile resource event application or an online resource event platform, and the input may be detected by the machine learning model 322, which prompts further actions by the authentication application 320.

In response to the detection of the resource provider 130 adding the first mobile telephone number 202 as part of the attempt to add a resource recipient to the list approved/verified resource recipients, authentication application 320 is configured to search a contact listing 340 stored in the second memory 312 (either internal to the second mobile communication device 300 or, in some embodiments, external to the second communication device 300, e.g., cloud storage or the like) to determine whether the first telephone number 210 is associated with a contact in the contact listing 340.

In response to determining that the first mobile communication number 210 is not associated with a contact in the contact listing 340, authentication application 320 including ML model(s) 322 is configured to search a historical telephone call listing 350 to determine whether the resource provider 130 has made calls to or received call from the first mobile telephone number 210 (i.e., calls to or from the resource recipient 120). In some embodiments of the invention, such a determination also includes the frequency of such calls and the nearness in time to current time of those calls. Further, in response to determining that the first mobile communication number 210 is not associated with a contact in the contact listing 340, authentication application 320 including ML model(s) 322 is configured access and perform a location comparison 360 of first and second mobile communication device location 362, 362 data received from the first and second location-determining mechanisms 216, 316 to determine whether the first mobile communication device 200 and the second mobile communication 300 have been within a predetermined geolocation range (i.e., in close proximity to one another). In some embodiments of the invention, such a determination also includes the frequency at which the devices were within the predetermined geolocation range and the nearness in time to current time of those instances. In this regard, searching of the call listing 350 and location comparison 360 determines whether the resource provider 130 has had contact, either physical or through telephone calls, with the resource recipient 120.

In response to determining that the first mobile communication number 210 is associated with a contact in the contact listing 340, authentication application 320 is configured to present the resource provider a confirmation notification that queries the resource provider as to whether the contact in the contact listing 340 is, in fact, the intended resource recipient 120. If the resource provider 120 responds in the affirmative, the resource recipient is deemed to be authenticated and no further actions are required. However, if the resource provider 120 responds in the negative, the authentication application 320 proceeds searching of the call listing 350 and location comparison 360 to determine whether the resource provider 130 has had contact with the resource recipient 120.

Based at least on determining whether (i) the resource provider 130 has made calls to or received calls from the first mobile telephone number 202 and (ii) the first mobile communication device 200 has been with the predetermined geolocation range of the second mobile communication device 300, authentication application 320 implements ML models 322 to either determine an application status 370 or provide the resource provider 130 authentication options 380 for authenticating the resource recipient 120. For example, in specific embodiments of the invention, the authentication application 320 itself may be configured to determine the authentication status 370, which may include (i) authenticating the resource recipient, (ii) denying the authentication status or (iii) requiring one or more further authentication mechanisms, while in other embodiments of the invention, the authentication application 320 is configured to provide the resource provider 130 with authentication options 380 include options to (i) authenticate the resource recipient, (ii) deny authentication or (iii) select from among one or more further authentication mechanisms.

Referring to FIG. 2 a block diagram is depicted of the second mobile communication device 300 configured for intelligent, precursory and systematized authentication, in accordance with embodiments of the present invention. In addition to providing greater details of the authentication application 320, FIG. 2 highlights various alternate embodiments of the invention. second mobile communication device 300, which is in possession of resource provider 130 and associated with second mobile telephone number 302, includes second computing platform 310 which is configured to execute instructions, such as algorithms, modules, routines, applications and the like. Second computing platform 310 includes second memory 312, which may comprise volatile and non-volatile memory, such as read-only and/or random-access memory (RAM and ROM), EPROM, EEPROM, flash cards, or any memory common to computing platforms). Moreover, second memory 312 may comprise cloud storage, such as provided by a cloud storage service and/or a cloud connection service.

Further, second computing platform 310 also includes at least one second processing device 314, which may be an application-specific integrated circuit ("ASIC"), or other chipset, logic circuit, or other data processing device. Second processing device(s) 314 may execute one or more application programming interface (APIs) 318 that interface with any resident programs, such as authentication application 320 or the like, stored in second memory 312 of second computing platform 310 and any external programs. Second processing devices(s) 314 may include various processing subsystems (not shown in FIG. 2) embodied in hardware, firmware, software, and combinations thereof, that enable the functionality of second computing platform 310 and the operability of second computing platform 310 on the distributed computing network 110 (shown in FIG. 1). For example, processing subsystems allow for initiating and maintaining communications and exchanging data with other networked devices. For the disclosed aspects, processing subsystems of second processing device(s) 314 may include any subsystem used in conjunction with authentication application 320 and related tools, routines, sub-routines, algorithms, sub-algorithms, sub-modules thereof.

Additionally, second computing platform 310 includes second location-determining mechanism 316, e.g., a Global Positioning System (GPS) device or the like, which is in communication with at least one of the second processor device(s) 314 and is configured to determine geolocation of the second mobile communication device 300.

Second computing platform 310 may additionally include a communications module (not shown in FIG. 2) embodied in hardware, firmware, software, and combinations thereof, that enables electronic communications between the second computing platform 310 and other networks and network devices, such as first mobile communication device 200 shown in FIG. 1. Thus, communication module may include the requisite hardware, firmware, software and/or combinations thereof for establishing and maintaining a network communication connection with one or more devices and/or networks.

Second memory 312 of second computing platform 310 includes an authentication application 320 having one or more Machine Learning (ML) models 322 and executable by at least one of the one or more second processing devices 314. As previously discussed, in specific embodiments of the invention, the authentication application 320 is configured to run on top of a mobile resource event application or an online resource event platform.

Authentication application 320 is configured to implement machine learning models 322 to detect/determine that the resource provider 130 is attempting to add 330 a resource recipient 120 to a list of approved/verified resource recipients associated with either a mobile resource event application or an online resource event platform. For example, the resource provider 120 may provide an input (e.g., name, resource repository number) to a entry field for adding a resource recipient within the mobile resource event application or an online resource event platform, and the input may be detected by the machine learning model 322, which prompts further actions by the authentication application 320.

In response to the detection of the resource provider 130 adding the first mobile telephone number 202 as part of the attempt to add a resource recipient to the list approved/verified resource recipients, authentication application 320 is configured to search a contact listing 340 stored in the second memory 312 (either internal to the second mobile communication device 300 or, in some embodiments, external to the second communication device 300, e.g., cloud storage or the like) to determine whether the first telephone number 210 is associated with a contact in the contact listing 340.

In additional embodiments of the invention, authentication application 320 is configured to search one or more other databases 342, e.g., external databases such as a database associated with a resource holding entity having a resource repository held by the resource provider, to determine whether the whether the first telephone number 210 is associated with an entry in the other database 342. In those embodiments of the invention in which the resource provider is a payee conducted a mobile or online payment, the other database may be a customer database of the financial institution at which the payee holds a payment account.

In response to determining that the first mobile communication number 210 is not associated with a contact in the contact listing 340 and, in some embodiments not associated with an entry in the other databases 342, authentication application 320 including ML model(s) 322 is configured to search a historical telephone call listing 350 to determine whether the resource provider 130 has made calls to or received call from the first mobile telephone number 210 (i.e., calls to or from the resource recipient 120). In some embodiments of the invention, such a determination also includes the frequency of such calls and the nearness in time to current time of those calls. Further, in response to determining that the first mobile communication number 210 is not associated with a contact in the contact listing 340, authentication application 320 including ML model(s) 322 is configured access and perform a location comparison 360 of first and second mobile communication device location 362, 362 data received from the first and second location-determining mechanisms 216, 316 to determine whether the first mobile communication device 200 and the second mobile communication 300 have been within a predetermined geolocation range (i.e., in close proximity to one another). In some embodiments of the invention, such a determination also includes the frequency at which the devices were within the predetermined geolocation range and the nearness in time to current time of those instances. In this regard, searching of the call listing 350 and location comparison 360 determines whether the resource provider 130 has had contact, either physical or through telephone calls, with the resource recipient 120.

In response to determining that the first mobile communication number 210 is associated with a contact in the contact listing 340 or, in some embodiments of the invention, an entry in the other database(s) 342, authentication application 320 is configured to present the resource provider a confirmation notification that queries the resource provider as to whether the contact in the contact listing 340 is, in fact, the intended resource recipient 120. If the resource provider 120 responds in the affirmative, the resource recipient is deemed to be authenticated and no further actions are required. However, if the resource provider 120 responds in the negative, the authentication application 320 proceeds searching of the call listing 350 and location comparison 360 to determine whether the resource provider 130 has had contact with the resource recipient 120.

In specific embodiments of the invention, authentication application 320 including ML models 322 are configured to determine an authentication confidence score 366 based at least on determining whether (i) the resource provider 130 has made calls to or received call from the first mobile telephone number 210, the frequency of such calls and the nearness in time to current time of those calls, and (ii) the first mobile communication device 200 and the second mobile communication 300 have been within a predetermined geolocation range, the frequency at which the devices were within the predetermined geolocation range and the nearness in time to current time of those instances. In further embodiments of the invention, other factors, such as the first mobile telephone number 202 being associated with an entry in one or more of the other databases 342, may be the basis for the authentication confidence score 366.

Based at least on determining whether (i) the resource provider 130 has made calls to or received calls from the first mobile telephone number 202 and (ii) the first mobile communication device 200 has been with the predetermined geolocation range of the second mobile communication device 300, authentication application 320 implements ML models 322 to either determine an application status 370 or provide the resource provider 130 authentication options 380 for authenticating the resource recipient 120. For example, in specific embodiments of the invention, the authentication application 320 itself may be configured to determine the authentication status 370, which may include (i) authenticating 372 the resource recipient, (ii) denying 374 the authentication status or (iii) requiring 376 one or more further authentication mechanisms, while in other embodiments of the invention, the authentication application 320 is configured to provide the resource provider 130 with authentication options 380 include options to (i) authenticate 382 the resource recipient, (ii) deny 384 authentication, or (iii) select 386 from among one or more further authentication mechanisms. In this regard, the authentication application may be configured to decision the authentication of the resource recipient 120 or the resource provider 130 may decision the authentication.

In those embodiments of the invention in which an authentication confidence 366 score is determined, the authentication confidence score 366 may determine the authentication status 370 or the authentication options 380 presented to the resource provider 130. In this regard, the authentication application 320 may include predetermined authentication confidence score thresholds, such that meeting or exceeding a certain threshold dictates either what authentication status 370 is given to the resource recipient or what authentication options 380 are provided to the resource provider 120. For example, in terms of authentication status 370, an authentication confidence score 366 below a certain threshold may require 376 that one or more further authentication mechanisms be implemented, while an authentication score above the threshold may authenticate 372 the resource recipient (i.e., no further authentication required). In another example, in terms of authentication options 380, an authentication confidence score 366 below a certain threshold may provide for the resource recipient to select 386 from one or more further authentication mechanisms, while an authentication score above the threshold may allow for the resource recipient to authenticate 372 the resource recipient (i.e., no further authentication required) or select 386 from one or more further authentication mechanisms.

In specific embodiments of the invention, the additional authentication mechanisms 390 that either are required 376 by the authentication application 320 or provided as options for selection 386 of further authentication by the resource provider 130 include purpose match authentication 392 and resource provider-generated One-Time-Passcode (OTP) authentication 394. Further details regarding purpose match authentication 392 are discussed in relation to the flow diagram of FIG. 4, infra. and further details regarding resource provider-generated OTP authentication 394 are discussed in relation to the flow diagram of FIG. 5, infra.

Referring to FIG. 3, a flow diagram is presented of a methodology 400 for intelligent precursory systematized authentication, in accordance with embodiments of the present invention. At Event 402, an attempt to add a resource recipient to an online resource event platform or mobile resource event application is detected and, in response to adding a mobile telephone number of the resource recipient during the attempt, at Event 404, a contact list is searched for a match between a contact information in the contact listing and the mobile telephone number.

At Decision 406, a determination is made as to whether the mobile telephone matches contact information in the contact listing. If the determination is made that a contact information does match the mobile telephone number, at Decision 408, a determination is made as to whether the contact associated with the matching contact information is the intended resource recipient. If the determination is made that the contact associated with the matching contact information is the intended resource recipient, at Event 410 the resource recipient is deemed to authenticated.

In specific embodiments of the invention, the determination of whether the contact associated with the matching contact information is the intended resource recipient may be made by presenting the resource provider a pop-up notification or the like that asks the resource provider to confirm that the contact is the resource recipient. If the resource provider replies in the affirmative, the resource recipient is deemed to be authenticated and, if the resource provider replies in the negative, further authentication occurs.

In response to either determining that contact information does not match the mobile telephone number or the contact associated with the matching contact information is not the intended resource recipient, at optional Event 412, one or more other databases are searched for a match between an entry in the database and the mobile telephone number. For example, the other database may be a user database associated with a resource holding entity at which the resource provider holds a resource repository. In specific embodiments of the invention, in which the resource provider is a payee, the other database may be a customer database associated with a financial institution at which the payee holds a payment account or the like.

At optional Decision 414, a determination is made as to whether the mobile telephone matches entry in the other database(s). If the determination is made that an entry does match the mobile telephone number, at optional Decision 416, a determination is made as to whether the entry is associated with the intended resource recipient. If the determination is made that the entry is associated with the intended resource recipient, at Event 418, the resource recipient is deemed to authenticated.

In specific embodiments of the invention, the determination of whether the entry is associated with intended resource recipient may be made by presenting the resource provider a pop-up notification or the like that asks the resource provider to confirm that the entry is associated with the intended resource recipient. If the resource provider replies in the affirmative, the resource recipient is deemed to be authenticated and, if the resource provider replies in the negative, further authentication occurs.

In response to either determining that entries in the other database(s) do not match the mobile telephone number or the entry is not associated with the intended resource recipient (or if the searching of the other database(s) is omitted from the process, in response to either determining that contact information does not match the mobile telephone number or the contact associated with the matching contact information is not the intended resource recipient, at Event 420, the call history of the resource provider's mobile communication device is searched for calls made to or from the mobile telephone number. Further, in response to either determining that entries in the other database(s) do not match the mobile telephone number or the entry is not associated with the intended resource recipient (or if the searching of the other database(s) is omitted from the process, in response to either determining that contact information does not match the mobile telephone number or the contact associated with the matching contact information is not the intended resource recipient, at Event 422, location data of the resource provider's mobile communication device and the resource recipient's mobile communication device is accessed and analyzed to determine whether the communication devices (and thus, the resource provider and resource recipient) have been within a predetermined geolocation range (i.e., close proximity of one another) and, if a determination is made that that the mobile devices have been within the predetermined geolocation range, the frequency of such encounters and currency of such encounters. While Events 420 and 422 are shown as occurring in sequence, one of ordinary skill in the art will appreciate that Events 420 and 422 may occur in parallel.

At optional Event 424, an authentication confidence score is determined based, at least, on the call history search, including the frequency and currency of the calls and the determination as to whether the location data analysis shows that the mobile devices have within the predetermined geolocation range including the frequency and currency of such encounters. In other specific embodiments other factors may be used in the determination of the authentication confidence score, such as determinations that the resource recipient's mobile telephone number is found in entries in other databases.

At Event 426, based on the call history search and the location data analysis, an authentication status or resource provider's authentication options are provided for the resource recipient. The authentication status may include one of (i) authenticate the resource recipient, (ii) deny the authentication, or (iii) require further authentication mechanisms. The options presented to the resource recipient may include (i) authenticate the resource recipient, (ii) deny the authentication, or (iii) selection of one or more further authentication mechanisms. In specific embodiments of the invention, in which an authentication confidence score is determined, authentication confidence score thresholds may determine which authentication status or which authentication option(s) are presented to the resource provider.

Referring to FIG. 4, a swim lane flow diagram is depicted of a methodology 500 for resource event purpose matching authentication, in accordance with embodiments of the present invention. At Event 502, the authentication application determines that purpose matching is required or, at Event 504, the resource recipient selects, from amongst one or more further authentication mechanism options, purpose matching. In response, at Event 506, the authentication application generates and communicates, via SMS/text or the like, a resource event expectation query/notification to the resource recipient, which queries the resource recipient as to whether they are expecting a resource event (e.g., payment) from the resource provider (without acknowledging the name of the resource provider only stating the mobile telephone number of the resource provider).

At Event 508, the resource recipient's mobile communication device receives the resource event expectation query/notification and, at Event 510, the response recipient responds to the resource event expectation query. At Decision 512, a determination is made as to whether the response was in the affirmative (i.e., resource recipient expecting a resource event) or in the negative (i.e., resource recipient expecting a resource event). If the determination is made that the response was in the negative, at Event 512, the resource recipient is not authenticated and a notification is sent to the resource provider notifying that the individual associated with the mobile telephone number is not expecting a resource event with the resource provider.

If a determination is made that the response is in the affirmative, at Event 516, a resource event purpose query/notification is generated and communicated to both the resource provider's mobile communication device and the resource recipient's mobile communication device. The resource event purpose query/notification asks both the resource provider and resource recipient to state a purpose for their impending resource event. At Events 518A and 518B, the respective resource provider's mobile communication device and resource recipient's mobile communication device receive the resource event purpose query/notification and, at Events 520A and 52B, the resource provider and response recipient provide inputs that respond to the resource event purpose query.

At Event 522, the responses to the resource event purpose query are received and correlated. In this regard, ML model(s) in the authentication application are implemented to understand the differences in the two responses and correlate to determine if the responses match (i.e., indicate the same purpose). For example, even the resource event purpose is the same, the resource recipient's response may use terms or phrases to define the purpose that differ from the terms or phrases in the resource provider's response. The ML model (s) are able to correlate the responses to determine if, in fact, the responses indicate the same purpose. In response to the correlation, at Decision 524, a determination is made as to whether the responses match in terms of purpose. If the determination is made that the purposes do not match, at Event 526, authentication is denied (or further authentication mechanisms are required/requested) and a notification may be sent to the resource provider indicating such. If a determination is made that the purposes do match, at Event 528, the resource recipient is deemed to be authenticated.

Referring to FIG. 5, a swim lane flow diagram is depicted of a methodology 600 for resource provider-generated One Time Password (OTP) authentication, in accordance with embodiments of the present invention. At Event 602, the authentication application determines that OTP authentication is required or, at Event 604, the resource recipient selects, from amongst one or more further authentication mechanism options, OTP authentication. In response, at Event 606, the resource recipient (as opposed to the authentication application, mobile resource event application or entity in control of the online resource event platform) composes/generated an OTP. The OTP may be of length, as chosen, by the resource provider and included any numbers, letters or characters. In specific embodiments of the invention, the OTP may be the answer to a shared secret between the resource provider and resource recipient (i.e., something that both the resource provider and resource recipient know). For example, the OTP may be, as chosen by the resource provider, "what college did the resource provider attend?" "What city does resource provider reside in?" or the like. At Event 608, the authentication application receives the resource provider entry of the OTP.

At Event 610, the authentication application provides the resource provider a plurality of communication means options for communicating the OTP to the resource recipient. The communication means options may include, but are not limited to, (i) SMS/text message sent from the resource provider's mobile communication device (as opposed to being sent through the mobile resource event application, (ii) a notification sent from the mobile resource event application or online resource event platform or (iii) an automated or manual voice call. In those instances in which the resource provider chooses the automated telephone call it may be advantageous for the resource provider to compose the OTP as a shared secret question, thus eliminating the need for the resource recipient to write down or remember a random OTP. In response to the authentication application providing the communication means options, at Event 612, the resource provider selects a communication means option.

At Event 614, the selected communication means is implemented to communicate the OTP to the resource recipient and, at Event 616, the resource recipient receives the OTP via the selected communication means (e.g., SMS/text message, mobile resource event application, voice call or the like). At Event 618, the resource recipient enters the OTP in an entry field requiring such and, in response, at Decision 620, the authentication determines whether the OTP entered by the resource recipient matches the OTP composed by the resource provider. If the OTP does not match, at Event 622, the resource recipient is denied authentication or further authentication mechanisms are required or requested. If the OTP does match, at Event 624, the resource recipient is deemed to be authenticated.

Referring to FIG. 6, a flow diagram is presented of a method 700 for intelligent precursory systematized authentication, in accordance with embodiments of the present invention. At Event 710, machine learning models of an authentication detect that a resource provider is attempting to add a resource recipient (e.g., add name, resource repository number, zip code, mobile telephone number and the like) to a list of verified resource recipients in a mobile resource event application or an online resource event platform. In specific embodiments of the invention, the resource provider is a payor intending to provide payment to payee (e.g., resource recipient) via a mobile payment application or an online payment platform.

In response to the resource provider inputting a mobile telephone number as part of the attempt to add the resource recipient, at Event 720, a contact listing stored, internally and/or externally, on the resource provider's mobile device is searched to determine whether the mobile telephone number is associated with (i.e., included within the contact information) a contact in the contact listing. If the search determines that the mobile telephone number is associated with a contact, a pop-up notification or the like may be displayed on the resource provider's mobile device, asking the resource provider to confirm whether the contact is the intended resource recipient. If the resource provider confirms that the contact is the intended resource recipient, the resource recipient is deemed to be authenticated.

In response to determining that the mobile telephone number is not associated with a contact in the contact listing or, in some embodiments, the resource provider failing to confirm that the contact matching the mobile telephone number is the intending resource recipient, at Event 730, (i) a historical call log of telephone calls made and received from the resource provider's mobile communication device is searched to determine whether the resource provider has made or received calls from the mobile telephone number, and, if so, in some embodiments, the volume of calls and the nearness in time to current time of the calls (ii) physical location data of the resource provider's mobile communication device and resource recipient's mobile communication device is accessed and analyzed to determine whether the mobile communication devices have been within a predetermined geolocation range (i.e., close proximity) of one another and, if so, in some embodiments, the frequency of such encounters and the nearness in time to current time of such encounters. In specific embodiments of the method, an authentication confidence score may be determined based on the call data and the location data.

At Event 730, based at least on (i) whether the resource provider has made or received calls from the mobile telephone number, and, in some embodiments, the volume of calls and the nearness in time to current time of the calls, and (ii) whether the mobile communication devices have been within a predetermined geolocation range of one another and, in some embodiments, the frequency of such encounters and the nearness in time to current time of such encounters, an authentication status is determined for the resource recipient or resource provider options for authenticating the resource recipient are determined. The authentication status may include, authenticating the resource recipient, denying authentication of the resource recipient and requiring one or more further authentication mechanisms. The authentication options presented to the resource provide may include, authenticating the resource recipient, denying authentication of the resource recipient, selecting from one or more further authentication mechanisms. As discussed herein, the further authentication mechanisms may include, but are not necessarily limited to, resource event purpose matching and resource provider-conceived OTP authentication.

Thus, present embodiments of the invention provide for an intelligent systematized approach to verifying identity (i.e., authentication) when conducting an online or mobile application resource event. As a result, the present invention, prevents instances in which the resource recipient may enter valid but unintended resource recipient information or instances in which the resource provider receives, either intentionally or unintentionally, information for the incorrect resource recipient.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent and precursory authentication of identity, the system comprising:

a first mobile communication device (i) associated with a resource recipient, (ii) assigned a first mobile telephone number, and (iii) comprising a first computing platform including a first memory, one or more first processing devices in communication with the first memory and a first geographic location-determining mechanism in communication with at least one of the first processing devices; and a second mobile communication device (i) associated with a resource provider, (ii) assigned a second mobile telephone number, and (iii) comprising a second computing platform including a second memory, one or more second processing devices in communication with the second memory and a second geographic location-determining mechanism in communication with at least one of the first processing devices, wherein the second memory stores an authentication application including at least one machine learning model, wherein the authentication application is executable by at least one of the second processing devices and is configured to:

determine that the resource provider is attempting to add the resource recipient to a list of approved resource recipients associated with an online resource event platform or a mobile resource event application, in response to the resource provider adding the first mobile telephone number as part of the attempt to add the resource recipient, search a list of contacts stored in the second memory to determine whether the first telephone number is associated with a contact in the list of contacts, in response to determining that the first telephone number is not associated with a contact in the list of contacts, (i) search a historical listing of telephone calls made and received by the second mobile communication to determine whether the resource provider has made or received calls to/from the first mobile telephone number, and (ii) access and analyze location data received from the first and second location-determining mechanisms to determine whether the first mobile communication device has been within a predetermined geolocation range of the second mobile communication device, and determine authentication status of the resource recipient or provide the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

2. The system of claim 1, wherein the authentication application is further configured to:
   determine the authentication status of the resource recipient, wherein the authentication status includes one selected from the group consisting of (i) authenticate the resource recipient, (ii) deny authentication of the resource recipient, and (iii) require further authentication.

3. The system of claim 1, wherein the authentication application is further configured to:
   provide the resource provider the authentication options for authenticating the resource recipient, wherein the authentication options include (i) authenticate the resource recipient, (ii) deny authentication of the resource recipient, and (iii) select from among one or more further authentication mechanisms.

4. The system of claim 1, wherein the authentication application is further configured to:
   in response to determining that the first telephone number is associated with a contact in the list of contacts, generate and provide a query notification on a display of the second mobile communication device that requires the resource provider to confirm that the contact is the resource recipient, and in response to the resource provider providing a first input to the query notification that confirms the contact is the resource recipient, provide authentication of the resource recipient, wherein providing authentication allows for the resource provider to be added to the list of approved resource recipients.

5. The system of claim 4, wherein the authentication application is further configured to:
   in response to the resource provider providing a second input to the query notification that denies that the contact is the resource recipient, (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device.

6. The system of claim 1, wherein the authentication application is further configured to:
   in response to the resource provider adding the first mobile telephone number as part of the attempt to add the resource recipient, search a resource repository database associated with a resource holding entity at which the resource provider holds resources to determine whether the first telephone number is associated with a resource repository held by a resource repository holder, and
   in response to determining that the first telephone number is not associated with (a) a contact in the list of contacts and (b) a resource repository, (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device.

7. The system of claim 6, wherein the authentication application is further configured to:
   in response to determining that the first telephone number is associated with a resource repository, generate and provide a query notification on a display of the second mobile communication device that requires the resource provider to confirm that the resource repository holder is the resource recipient, and in response to the resource provider providing a first input to the query notification that confirms the resource repository holder is the resource recipient, provide authentication of the resource recipient, wherein providing authentication allows for the resource provider to be added to the list of approved resource recipients.

8. The system of claim 7, wherein the authentication application is further configured to:
   in response to the resource provider providing a second input to the query notification that denies that the resource repository holder is the resource recipient, (i) search the historical listing of telephone calls made and received by the second mobile communication to determine whether the resource provider has made or received calls to/from the first mobile telephone number, and (ii) access and analyze the location data received from the first and second location-determining mechanisms to determine whether the first mobile communication device has been within the predetermined geolocation range of the second mobile communication device.

9. The system of claim 1, wherein the authentication application is further configured to:
   determine an authentication confidence score based at least on (i) whether the resource provider has made or received calls to/from the first mobile telephone number, (ii) the volume of calls made to or received from the first mobile telephone number, (iii) a nearness to current time of calls made to or received from the first mobile telephone number (iv) whether the first mobile communication device has been within the predetermined geolocation range of the second mobile communication device, (v) the volume of instances that the first mobile communication device has been within the predetermined geolocation range of the second mobile communication device, and (vi) a nearness to current time of instances in which the first mobile communication device has been within the predetermined geolocation range of the second mobile communication device.

10. The system of claim 9, wherein the authentication application is further configured to:
    determine, based on a plurality of confidence score thresholds, at least one selected from the group consisting of (i) authentication of the resource recipient, (ii) that the resource provider is required to confirm an individual associated with the first mobile telephone number as the resource recipient, wherein the confirmation provides authentication, (iii) that the resource required is to be provide further authentication mechanisms, or (iv) require further authentication.

11. The system of claim 1, wherein the authentication application is further configured to:

generate and initiate communication of a first query notification to the first mobile communication device that asks the resource recipient whether they are expecting resources from someone associated with the second mobile telephone number, in response to receiving an input to the first query notification that confirms that the resource recipient is expecting resources from someone associated with the second mobile telephone number, generate and communicate a second query notification to the first mobile communication and the second mobile communication that asks the resource recipient and the resource provider to input a purpose for a pending resource exchange event, in response to receiving, from the resource recipient and the resources provider, inputs to the second query notification that define a purpose for the pending resource exchange event, correlate differences in the inputs to determine whether the purposes for the pending resource exchange match, and in response to determining that the purposes for the pending resource exchange match, provide authentication to the resource recipient.

12. The system of claim 11, wherein the authentication application is further configured to:

generate and initiate communication of the first query notification to the first mobile communication device in response to (i) the authentication status of the resource recipient requiring further authentication, or (ii) providing the resource provider an option to choose from amongst one or more further authentication mechanisms including a purpose matching authentication option and the resource provider selecting the purpose matching authentication option.

13. The system of claim 1, wherein the authentication application is further configured to:

request the resource provider to generate and input a One Time Password (OTP), in response to the resource provider inputting the resource provider-generated OTP, communicate the OTP to the first mobile communication device, and in response to the resource recipient providing the OTP within a designated entry field, provide authentication of the resource recipient.

14. The system of claim 13, wherein the authentication application is further configured to:

provide the resource provider with a plurality of options for communicating the OTP to the first mobile communication, wherein the plurality of options include (i) a Short Message Service (SMS) message communicated from the second mobile communication device, (ii) a message communicated from either the online resource event platform or the mobile resource event application, (iii) an automated telephone call, and (iv) a manual telephone call made by the resource provider.

15. The system of claim 13, wherein the authentication application is further configured to:

request the resource provider to generate and input the One Time Password (OTP), wherein the OTP is an answer to a shared secret known by both the resource recipient and resource provider.

16. The system of claim 13, wherein the authentication application is further configured to:

request the resource provider to generate and input the OTP, in response to (i) the authentication status of the resource recipient requiring further authentication, or (ii) providing the resource provider an option to choose from amongst one or more further authentication mechanisms including an OTP authentication option and the resource provider selecting the OTP option.

17. A computer-implemented method for intelligent and precursory authentication of identity, the method is executed by one or more processing devices in a first mobile communication device and comprises:

determining that a resource provider is attempting to add a resource recipient to a list of approved resource recipients associated with an online resource event platform or a mobile resource event application;

in response to the resource provider adding a mobile telephone number as part of the attempt to add the resource recipient, searching a list of contacts stored on a first mobile communication device in possession of the resource provider to determine whether the mobile telephone number is associated with a contact in the list of contacts;

in response to determining that the mobile telephone number is not associated with a contact in the list of contacts, (i) searching a historical listing of telephone calls made and received by the first mobile communication device to determine whether the resource provider has made or received calls to/from the mobile telephone number, and (ii) accessing and analyzing physical location data of the first mobile communication and a second device in possession of the resource recipient to determine whether the first mobile communication device has been within a predetermined geolocation range of the second mobile communication device; and determining authentication status of the resource recipient or providing the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

18. The computer-implemented method of claim 17, further comprising:

based on (i) the authentication status, or (ii) the resource provider selecting a purpose matching authentication option:

generating and initiating communication of a first query notification to the second mobile communication device that asks the resource recipient whether they are expecting resources from someone associated with the first mobile telephone number;

in response to receiving an input to the first query notification that confirms that the resource recipient is expecting resources from someone associated with the first mobile telephone number, generating and communicating a second query notification to the second mobile communication and the first mobile communication that asks the resource recipient and the resource provider to input a purpose for a pending resource exchange event; and in response to receiving, from the resource recipient and the resources provider, inputs to the second query notification that define a purpose for the pending resource exchange event, correlating differences in the inputs to determine whether the purposes for the pending resource exchange match, and in response to determining that the purposes for the pending resource exchange match, providing authentication to the resource recipient.

19. The computer-implemented method of claim 17, further comprising:
based on (i) the authentication status, or (ii) the resource provider selecting a One Time Password (OTP) authentication option:
requesting the resource provider to generate and input a One Time Password (OTP);
in response to the resource provider inputting the resource provider-generated OTP, initiating communication of the OTP to the second mobile communication device; and
in response to the resource recipient providing the OTP within a designated entry field, provide authentication of the resource recipient.

20. A computer program product comprising:
a non-transitory computer-readable medium comprising:
a first set of codes for causing a first mobile communication device to determine that a resource provider is attempting to add a resource recipient to a list of approved resource recipients associated with an online resource event platform or a mobile resource event application;
a second set of codes for causing the first mobile communication device to, in response to the resource provider adding a mobile telephone number as part of the attempt to add the resource recipient, search a list of contacts stored on a first mobile communication device in possession of the resource provider to determine whether the mobile telephone number is associated with a contact in the list of contacts;
a third set of codes for causing the first mobile communication device in response to determining that the mobile telephone number is not associated with a contact in the list of contacts, (i) searching a historical listing of telephone calls made and received by the first mobile communication device to determine whether the resource provider has made or received calls to/from the mobile telephone number, and (ii) accessing and analyzing physical location data of the first mobile communication and a second device in possession of the resource recipient to determine whether the first mobile communication device has been within a predetermined geolocation range of the second mobile communication device; and
determining authentication status of the resource recipient or providing the resource provider authentication options for authenticating the resource recipient based at least on the determining of whether (i) the resource provider has made or received calls to/from the first mobile telephone number, and (ii) the first mobile communication device has been within the predetermined geolocation range of the second mobile communication device.

\* \* \* \* \*